Nov. 19, 1968  A. STRICKLER  3,412,007
CONTINUOUS FLOW ELECTROPHORESIS APPARATUS
Filed Aug. 23, 1965  2 Sheets-Sheet 1

INVENTOR:
ALLEN STRICKLER
BY
ATTORNEY

3,412,007
CONTINUOUS FLOW ELECTROPHORESIS APPARATUS
Allen Strickler, Fullerton, Calif., assignor to Beckman Instruments, Inc., a corporation of California
Filed Aug. 23, 1965, Ser. No. 481,855
8 Claims. (Cl. 204—299)

The present invention relates generally to continuous flow electrophoresis apparatus.

Electrophoresis, in general, is the phenomenon of migration of charged particles or ions in a liquid carrier medium under the influence of an electric field. This phenomenon can be used to separate small particles which, by reason of different surface chemical properties, exhibit different concentrations of surface charge in the given medium. As a result of these distinctive surface properties, the mobilities of various classes of charged particles in the carrier medium will be different under the influence of the electric field.

The present invention relates in particular to what may be termed continuous, free-flow electrophoresis, in which a buffer solution or electrolyte is made to flow freely as a uniform film or sheet. An electric potential gradient is applied to the sheet at some angle to the flow, typically being perpendicular thereto. A sample continuously introduced at some point into the sheet of eletcrolyte flows in a narrow band in the absence of the potential gradient. When the potential gradient is applied to the sheet of electrolyte, the sample particles are separated under the influence of the electrical field into various particle groups or components depending upon the electrophoretic mobility of the respective particles, the strength of the field and the length of time the particles remain in the field. Particles of a single mobility are concentrated in a single zone or band, the several bands fanning out from the point of sample application.

It is desirable to collect or remove at will any selected band, or a number of selected bands, of particles in the electrophoretic pattern without disturbing the constancy and uniformity of flow in the moving sheet. It may furthermore be desirable to remove sample components by a scanning process, that is, to collect components progressively from one end of the band pattern to the other. Such a scanning process may be used, for example, to search for a suspected component or to make a relatively rapid determination of what components are present.

Accordingly, it is an object of the present invention to provide a continuous flow electrophoresis apparatus which permits the removal of any one or a number of selected particle bands in the electrophoretic pattern with virtually no disturbance of the flowing electrolytic sheet.

It is a more specific object of the present invention to provide a continuous flow electrophoresis apparatus which permits the removal of any one or a number of selected particle bands by shifting the electrophoretic pattern.

It is a further object of the present invention to provide a continuous flow electrophoresis apparatus in which substantially the entire electrophoretic pattern may be scanned.

According to one specific, exemplary form or embodiment of the present invention shown and described herein, there is provided a pair of substantially flat plates of electrically insulating material mounted in substantially parallel, face-to-face relationship and separated from each other by gasket or spacer means sandwiched between the plates. The spacer means may, for example, occupy regions near the ends of the plates thereby defining between them an interspace serving as an electrophoresis working space into which is fed a buffer solution or electrolyte. In a preferred embodiment of the invention, the electrolyte enters at a single point at one end of the working space, for example at the top, and exists at a single discharge point near the other end, for example, the bottom. The working space is shaped so that the eletcrolyte is subject to smooth laminar flow. The sample to be fractionated is injected near the place of electrolyte entry by means of an adjustably positionable element and one or more sample component removal points are provided downstream of the sample injection point. An electric potential gradient applied to the sheet, substantially transverse to the direction of flow, causes electrophoretic separation of the sample as it moves along with the flowing sheet. By varying the position of the sample injecting element, the entire electrophoretic pattern may be shifted laterally and any specific band or group of bands may be removed at the component removal point or points. Further, by continuously varying the position of the sample injecting element, the entire eletcrophoretic spectrum may be scanned.

According to another specific, exemplary embodiment of the present invention, a continuous flow electrophoresis apparatus, such as described immediately above, is provided with one or more adjustably positionable sample component removal points. In this way, any selected band may be removed, or a group of bands may be extracted from the fractionating pattern simultaneously.

The novel features which are believed to be characteristic of the invention are set forth with particularity in the appended claims. The invention itself, however, together with further objects and advantages thereof, can be best understood by reference to the following description taken in connection with the accompanying drawings in which:

Figure 1:
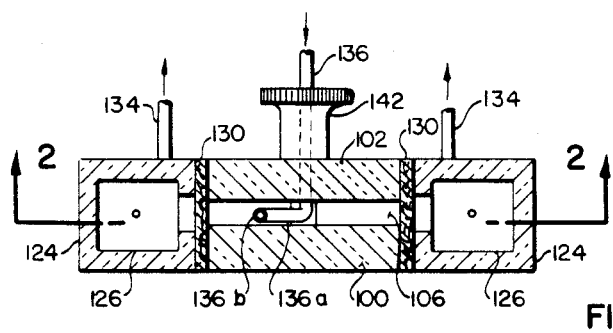
FIG. 1 is a top sectional view of an apparatus illustrative of the present invention.
Figure 2:
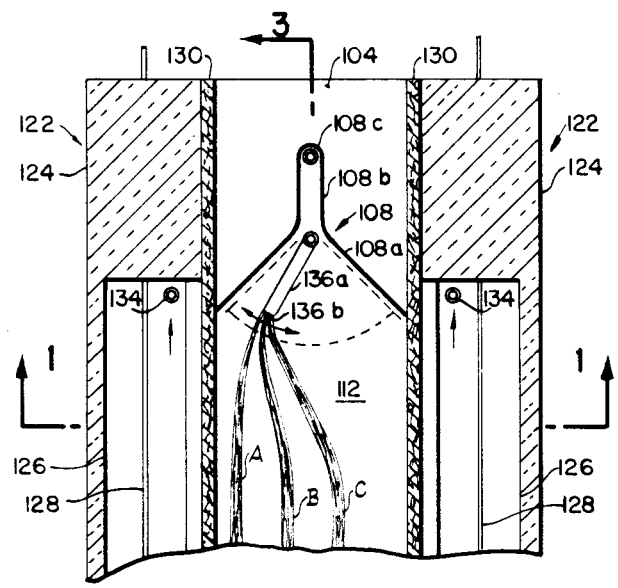
FIG. 2 is a sectional front view of the apparatus of FIG. 1 taken along the plane 2—2.
Figure 3:
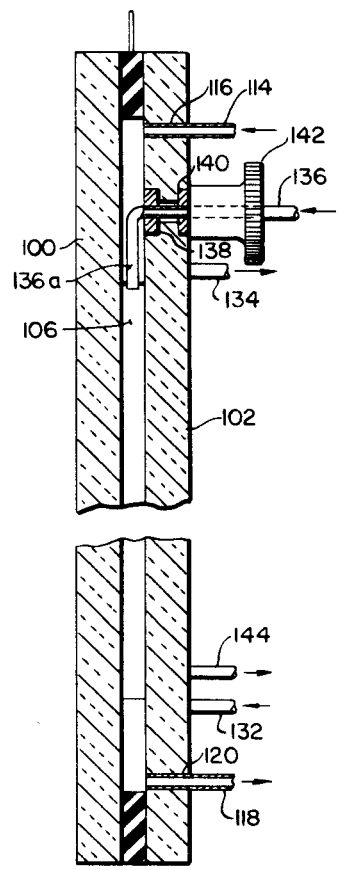
FIG. 3 is a sectional side view of the apparatus of FIG. 2 taken along the plane 3—3.

Turning now to the drawings, there is shown in FIGS. 1-3 a first exemplary embodiment of the continuous flow electrophoresis apparatus of the present invention. Two susbtantially flat plates 100 and 102, suitably supported by means not shown, are held in substantially parallel, face-to-face relationship. The plates 100 and 102 are separated by a gasket or spacer means 104 and 105 sandwiched between the plates near their ends. The plates 100 and 102 may be made of glass or any other suitable electrically-insulating material. The spacers 104 and 105 may be fabricated of rubber or a similar material.

The spacers 104 and 105 are shaped so as to define a working space 106 between the plates 100 and 102 which serves as a conduit for the flowing electrolyte. In the embodiment illustrated in FIGS. 1-3, the space 106 has a top section, designated generally by the reference numeral 108, having the shape of an inverted Y. The inverted Y-shaped section 108 has a fan-shaped portion 108a, a narrow, upper portion 108b in the shape of a parallel-sided channel and a rounded apex 108c atop the channel 108b. The bottom section of the working space, designated by the numeral 110, is V-shaped and has a lower extremity 110a. An intermediate section 112, defined by the lateral edges of the plates 100 and 102 and having substantially parallel sides, interconnects the top and bottom sections 108 and 110.

Electrolyte is supplied to the working space 106 via a tube 114, mounted in a hole 116 in the plate 102, the hole 116 being located at the apex 108c of the inverted Y-shaped section 108. The electrolyte fans out from the apex 108c, flows in substantially parallel lines down the narrow channel 108b, diverges once again in the fan-shaped portion 108a and then continues down the intermediate section 112 in parallel flow lines. Upon reaching the bottom, V-shaped section 110, the flow lines converge toward the point 110a. The electrolyte is withdrawn or vented via a tube 118 mounted in a hole 120 in the plate 102. By introducing the flowing electrolyte sheet at a single point, uniform, laminar flow is obtained. The venting of the sheet at a single point greatly enhances this objective.

Means are provided for applying an electric potential gradient across the electrolyte sheet flowing within the working space 106. This may take the form of an electric assembly 122 on each side of the space 106 comprising generally a housing 124, defining an elongated chamber 126, and a wire electrode 128 disposed in the chamber 126. The housing 124 is mounted exteriorly of an ion-permeable barrier 130 sandwiched between the housing 124 and the lateral edges of the working space 106. The barrier 130, which is in fluid communication with both the working space 106 and the chamber 126, permits ions to flow between the chamber 126 and the working space 106 but substantially prevents bulk flow of liquid. As shown in FIGS. 1 and 2, the ion-permeable barrier may be made to extend substantially the entire length and thickness of the apparatus to prevent leakage. The various sub-assemblies and elements of the apparatus may be held together by any suitable clamping means (not shown). Buffer solution, which may be flowed continuously in the chamber 126, serves to electrically connect the electrodes 128 with the ion-permeable barrier 130 and the electrolyte in the working space 106. By continuously flowing the buffer solution, concentration polarization effects may be minimized. The buffer solution enters the chamber 126 via an inlet tube 132 near the bottom of the chamber and exists via an outlet tube 134 near the top of the chamber. By flowing the solution in an upward direction, any gases generated are effectively carried away.

A sample to be fractionated into its components is introduced or injected into the working space 106 via suitable injection means such as a tubular element 136 which is rotatably mounted in the plate 102. A pump or gravity flow means (not shown) supplies the sample at a uniform flow rate. The tube 136 is provided with a vertical section 136a lying in the interspace 106 and disposed substantially parallel to the interior faces of the plates 100 and 102. The vertical section 130a terminates in an injection tip 136b from which the sample flows into the electrolyte sheet. The tube 136 is preferably fabricated of a non-conducting material, for example, nylon, to avoid electrolysis effects. The horizontal portion of the tube 136 is rotatably supported by leakproof bearing means mounted in the plate 102. In the instant embodiment, the leakproof bearing means may be in the form of a pair of plastic inserts 138 and 140 mounted in corresponding recesses formed in the plate 102. A wheel 142, secured to the tube 136, is provided for actuating the tube 136. The wheel 142 may be manually or mechanically operated.

The tube 136 is mounted so that the injection tip 136b lies at a point downstream of the electrolyte introduction point 108c. In the embodiment illustrated in FIGS. 1–3, the injection tip 136b lies within the fan-shaped portion 108a of the inverted Y section 108, permitting the tip 136b to be swivelled to substantially any point across the flowing electrolyte sheet. In addition, by rotatably mounting the tube 136 approximately at the vertex of the fan-shaped portion 108a, the vertical tube section 136a is always essentially parallel to the flow lines of the electrolyte, irrespective of its angular position. As a result of this geometry, there is virtually no disturbance of the flow lines.

In the embodiment depicted in FIGS. 1–3 of drawings, means for removing one or more selected sample components are provided in the form of one or more tubes mounted in holes in one of the plates downstream of the sample injection point. Two such tubes, designated by the reference numerals 144 and 146, are shown in FIGS. 1–3.

In the operation of the apparatus of FIGS. 1–3, the sample injected into the flowing electrolyte sheet from the injection tip 136b fractionates, under the influence of the applied potential gradient, into its various components as the sample is swept along by the moving sheet. A plurality of zones or bands is formed in a fan-like pattern as, for example, bands A, B and C in FIG. 2. The path of a particular band of particles is the resultant of its vertical velocity (substantially equal to the electrolyte velocity and equal for all components), and its horizontal velocity, dependent on the electrophoretic mobility of the particle and the strength of the electric field.

By adjusting the angular position of the vertical tube section 136a, by manipulation of the wheel 142, the entire electrophoretic pattern may be laterally shifted to one side or the other and a selected sample band or bands may be brought into registry with one or more sample component removal tubes such as 144 and 146 and thereby removed to the exclusion of all other bands. For example, as illustrated in FIG. 2, band B may be brought into registry with the tube 144.

To scan the whole particle spectrum, the angular position of the tube 136 may be continuously varied, manually or automatically. In this way, all of the bands may be continuously sampled from substantially one extremity of the spectrum to the other.

Figure 4:
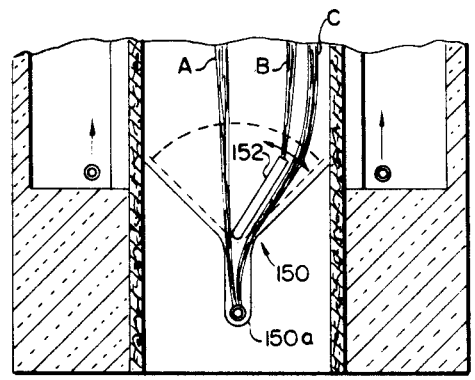
FIG. 4 is a sectional front view of an apparatus exemplary of an alternative embodiment of the present invention; and, FIG. 5 is a sectional front view of yet another alternative embodiment of an apparatus according to the present invention.

FIG. 4 shows an alternative embodiment of the present invention in which an adjustably positionable sample removal tube is employed. In this embodiment, the working space 106 is provided with a Y-shaped lower section 150 similar to, and symmetrical with, the inverted Y-shaped upper section 108. The working electrolyte is vented via a tube in communication with the lower extremity 150a of the section 150. A sample removal tube 152, having an upwardly directed section lying within the interspace 106 substantially parallel with the interior faces of the plates 100 and 102, is rotatably mounted on the plate 102 in a manner similar to the sample injection tube 136. By varying the angular position of the tube 152, any sample band, as for example, band B in FIG. 4 may be selectively removed. Since in this arrangement the extracted sample band is removed from the flowing film with substantially no change in its direction of flow, there is minimal disturbance of the flowing electrolyte sheet at the point of sample removal. In addition, by placing the rotatable mounting approximately at the vertex of the fan-shaped portion of Y-shaped section 150, the tube 152 lies substantially parallel to the electrolyte flow lines irrespective of its angular position. Turbulence or discontinuities in the flowing electrolyte sheet are thereby further avoided. The apparatus of FIG. 4 permits scanning of the entire electrophoretic spectrum by continuously varying the angular position of the tube 152 either independently or in combination with movement of the sample injection tube 136.

Figure 5:
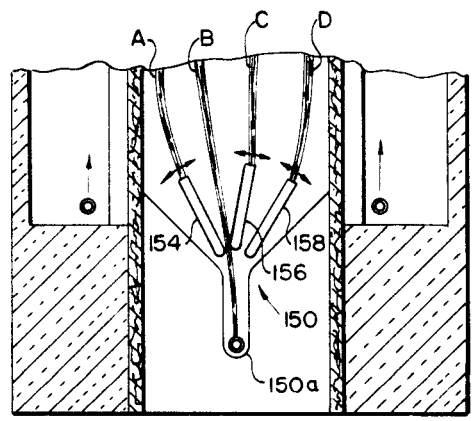

In FIG. 5, another alternative embodiment of the present invention is shown in which a plurality of adjustably positionable sample component removing means are utilized. The flow-defining spacer means is shaped as it is for the embodiment of FIG. 4, being provided with Y-shaped sections 108 and 150 at the upper and lower ends, respectively. Any convenient number of sample removal tubes, rotatably mounted in a manner similar to the mounting of the sample injection tube 136, may be utilized. The particular apparatus illustrated in FIG. 5 employs three such tubes 154, 156 and 158 having vertical, upwardly projecting ends within the working space 106. With the apparatus of FIG. 5, a number of sample component bands, as for example, bands A, C and D may be removed simultaneously.

It will be obvious to those skilled in the art that various modifications may be made to the specific exemplary embodiment of the invention described. For example, the embodiment illustrated in FIG. 4, being symmetrical, may be operated in either direction. That is, the electrolyte may be made to flow upwardly, the pressure head and the flow rate being held substantially constant by any suitable means. Under certain operating conditions such upward flow may help minimize disturbing thermal convective forces. Utilizing this mode of operation, the sample is injected into the flowing electrolyte sheet from the bottom swivel tube and the selected sample component or components are removed by the upper swivel tube or tubes.

While particular embodiments have been discussed and described, it will be understood that the invention is not limited thereto and that it is contemplated to cover in the appended claims any such modifications as fall within the true spirit and scope of the invention.

What is claimed is:

1. An apparatus for continuous flow electrophoresis comprising
    a pair of substantially flat plates of electrically insulating material;
    means supporting said plates in substantially parallel, face-to-face relationship;
    spacer means for maintaining a separation between said plates and defining an electrophoresis working space therebetween;
    means for introducing an electrolyte into said working space at a first point;
    means for venting said electrolyte from said working space at a second point, said electrolyte flowing as a laminar flow sheet in said working space between said first and second points;
    means for injecting into said working space downstream of said first point, a sample to be electrophoretically separated, said injecting means being adjustably positionable whereby said sample may be injected at any selected point across said flowing electrolyte sheet;
    means for removing a selected sample component band from said working space at a third point, downstream of said sample injection point, said sample component band removed depending upon the position of said sample injecting means; and,
    means for applying an electric potential gradient across said working space.

2. An apparatus as defined in claim 1 in which
    said working space comprises a Y-shaped section having an apex, a V-shaped section converging to an extremity and an intermediate section having substantially parallel sides joining said Y-shaped and V-shaped sections;
    said electrolyte introducing means is located at said apex of said Y-shaped section;
    said sample injecting point is located within the fan-shaped portion of said Y-shaped section; and,
    said electrolyte venting means is located at said extremity of said V-shaped section.

3. An apparatus as defined in claim 2 in which
    said sample injecting means comprises a tubular swivel element having two legs at substantially right angles to each other, one of said legs being pivotally supported by one of said plates approximately at the vertex of said fan-shaped portion of said Y-shaped section, the other of said legs being disposed in said working space and having an open end from which said sample flows.

4. An apparatus as defined in claim 1 in which
    said means for removing said selected sample component band is adjustably positionable whereby the particular sample component band removed depends upon the positions of said sample injecting means and said sample removing means.

5. An apparatus as defined in claim 4 in which
    said sample component removing means comprises a plurality of adjustably positionable tubular swivel elements each disposed in said working space generally parallel to the direction of flow of said electrolyte at each respective element, each said tubular element being pivotally supported by one of said plates and having an open end for receiving a selected sample component band.

6. An apparatus as defined in claim 4 in which
    said working space comprises an upper, inverted Y-shaped section having an apex, a lower Y-shaped section having a lower extremity and an intermediate section having substantially parallel sides joining said upper and lower sections;
    said electrolyte introducing means is located at said apex of said inverted Y-shaped section;
    said sample injecting point is located within the fan-shaped portion of said inverted Y-shaped section;
    said electrolyte venting means is located at said lower extremity of said lower Y-shaped section; and
    said adjustably positionable sample component removing means is located within the fan-shaped portion of said lower Y-shaped section.

7. An apparatus as defined in claim 6 in which
    said adjustably positionable sample component removing means comprises a tubular swivel element having two legs at substantially right angles to each other, one of said legs being pivotally supported by one of said plates approximately at the vertex of said fan-shaped portion of said lower Y-shaped section, the other of said legs being disposed in said working space and having an open end for receiving said sample component.

8. An apparatus as claimed in claim 1 wherein said sample injecting means comprises a tubular conduit pivotally mounted to one of said plates.

References Cited

UNITED STATES PATENTS

| | | | |
|---|---|---|---|
| 2,555,487 | 6/1951 | Haugaard et al. | 204—180 |
| 2,879,217 | 3/1959 | Durrum et al. | 204—299 |

HOWARD S. WILLIAMS, *Primary Examiner.*

A. C. PRESCOTT, *Assistant Examiner.*